United States Patent
Chalamala et al.

(10) Patent No.: US 9,882,719 B2
(45) Date of Patent: Jan. 30, 2018

(54) METHODS AND SYSTEMS FOR MULTI-FACTOR AUTHENTICATION

(71) Applicant: Tata Consultancy Services Limited, Mumbai (IN)

(72) Inventors: Srinivasa Rao Chalamala, Hyderabad (IN); Sankha Subhra Som, London (GB)

(73) Assignee: Tata Consultancy Services Limited, Mumbai (IN)

( * ) Notice: Subject to any disclaimer, the term of this patent is extended or adjusted under 35 U.S.C. 154(b) by 141 days.

(21) Appl. No.: 15/065,585

(22) Filed: Mar. 9, 2016

(65) Prior Publication Data

US 2016/0315771 A1    Oct. 27, 2016

(30) Foreign Application Priority Data

Apr. 21, 2015    (IN) .......................... 1631/MUM/2015

(51) Int. Cl.
*H04L 29/06*    (2006.01)
*H04L 9/32*    (2006.01)

(52) U.S. Cl.
CPC ............ *H04L 9/321* (2013.01); *H04L 9/3228* (2013.01); *H04L 9/3231* (2013.01); *H04L 2209/608* (2013.01)

(58) Field of Classification Search
CPC ...... H04L 9/321; H04L 9/3228; H04L 9/3231
(Continued)

(56) References Cited

U.S. PATENT DOCUMENTS 6,438,692 B2 * 8/2002 Kato ..................... G06T 1/0021
380/201
8,185,646 B2    5/2012 Headley
(Continued)

FOREIGN PATENT DOCUMENTS

EP    2074546    7/2009
EP    2283418    2/2011
(Continued)

OTHER PUBLICATIONS

Swivel Technical White Paper, "PINsafe Multifactor Authentication Solution", http://archiv.ip4sec.eu/open_downloads/2009/Swivel_PINsafe_Multifactor_Authentication_0309.pdf, (2009), pp. 1-13.

*Primary Examiner* — Michael S McNally
(74) *Attorney, Agent, or Firm* — Finnegan, Henderson, Farabow, Garrett & Dunner LLP

(57) ABSTRACT

This disclosure relates generally to multi-factor authentication, and more particularly to method and system for multi-factor authentication. In one embodiment, the method includes receipt of an audio input at a device, and a plurality of authentication parameters from at least one of the device and a server communicably coupled to the device. The plurality of authentication parameters are encrypted to generate a plurality of encrypted authentication parameters. The plurality of encrypted authentication parameters are embedded as watermarks into the audio input to generate a watermarked audio signal. The watermarked audio signal are encrypted to generate an authentication audio signal. The authentication audio signal is transmitted to an authentication server over an audio communication channel to authenticate the access at the device.

15 Claims, 4 Drawing Sheets

(58) Field of Classification Search
USPC .......................................................... 715/155
See application file for complete search history.

(56) References Cited

U.S. PATENT DOCUMENTS

| | | |
|---|---|---|
| 8,327,142 B2 | 12/2012 | Lund et al. |
| 8,536,976 B2 | 9/2013 | Headley et al. |
| 2002/0055843 A1* | 5/2002 | Sakai ...................... G10L 13/00 704/258 |
| 2007/0283142 A1* | 12/2007 | Milstein .................. H04L 63/08 713/155 |
| 2013/0203345 A1* | 8/2013 | Fisher .................... H04B 11/00 455/41.1 |
| 2016/0105428 A1* | 4/2016 | Schrempp ........... H04L 63/0853 726/7 |
| 2017/0163620 A1* | 6/2017 | Muttik .................... H04L 63/08 |

FOREIGN PATENT DOCUMENTS

| WO | WO 2008/043090 | 4/2008 |
|---|---|---|
| WO | WO 2009/140170 | 11/2009 |

\* cited by examiner

METHODS AND SYSTEMS FOR MULTI-FACTOR AUTHENTICATION

PRIORITY CLAIM

This U.S. patent application claims priority under 35 U.S.C. § 119 to: India Application No. 1631/MUM/2015, filed on Apr. 21, 2015. The entire contents of the aforementioned application are incorporated herein by reference.

TECHNICAL FIELD

This disclosure relates generally to multi-factor authentication, and more particularly to method and system for multi-factor authentication using an encrypted audio watermark.

BACKGROUND

With the growth of the Internet and communication technology, more and more information is being exchanged over the Internet. The information includes, but is not limited to, services, applications, and content. Said information includes personal as well as public information associated with a user. In the scenarios where the information communicated over the Internet is personal information, additional care has to be taken for maintaining trustworthiness of users accessing the information and user devices utilized for communication. For communicating the information in a secure environment, various authentication schemes are utilized for authentication of the users accessing such information. For example, in order to access an online banking application, users have to authenticate themselves so as to be able to log-in to the application.

In order to authenticate a user access, applications and services utilize more than one authentication techniques. For instance, various multi-factor authentication techniques are available that may utilize a challenge-response authentication approach. The challenge-response authentication approach refers to a family of protocols wherein one of the parties (also known as a challenger) presents a query, and another party (also known as a respondent) responds to the query. In case the response to the query matches with the 'expected response', authentication is assumed to be successful, and the user gets an access to the service/application. An example of challenge-response protocol includes a Completely Automated Public Turing test to tell Computers and Humans Apart (CAPTCHA) code authentication, where the challenge includes identifying a distorted CAPTCHA code and a valid response includes identifying the text included in the CAPTHCHA code. In certain scenarios, more than one factors for authentication are utilized for authentication. For example, in addition to CAPTCHA, a password authentication, a voice based authentication, and some other factors/forms of authentication can be employed for providing a robust information transmission over the internet. Such authentications involving multiple factors are termed as 'multi-factor authentication'.

Typically, systems incorporating multi-factor authentication utilize different communication channels to exchange authentication information between the challenger and the respondent. For example, a 3-factor authentication system may make use of an audio or video communication channel for biometric data, a wired or wireless communication channel for passphrase and a wired or wireless communication channel for exchanging tokens. However, the use of multiple communication channels makes the deployment of such multi-factor systems expensive.

SUMMARY

Embodiments of the present disclosure present technological improvements as solutions to one or more of the above-mentioned technical problems recognized by the inventors in conventional systems. For example, in view of the foregoing, an embodiment herein provides a method and system for multi-factor authentication to authenticate an access at a device for a communication session. In one aspect, a processor-implemented method for multi-factor authentication is provided. The method includes facilitating, via one or more hardware processors, receipt of an audio input at the device. The audio input is one of a speech utterance and a pre-recorded audio content. Further, the method includes facilitating, via the one or more hardware processors, receipt of a plurality of authentication parameters at the device, an authentication parameter from the plurality of authentication parameters being received from at least one of the device and a server communicably coupled to the device. Furthermore, the method includes encrypting, via the one or more hardware processors, the plurality of authentication parameters to generate a plurality of encrypted authentication parameters. Moreover, the method includes embedding, via the one or more hardware processors, the plurality of encrypted authentication parameters as watermarks into the audio input to generate a watermarked audio signal. Also, the method includes encrypting, via the one or more hardware processors, the watermarked audio signal to generate an authentication audio signal. The authentication audio signal is transmitted to an authentication server over a communication channel to authenticate the access at the device for a communication session.

In another aspect, a processor-implemented system for multi-factor authentication to authenticate is provided. The system includes: at least one memory; and one or more hardware processors. The at least one memory is coupled to the one or more hardware processors, wherein the one or more hardware processors are capable of executing programmed instructions stored in the at least one memory to facilitate receipt of an audio input at the device. The audio input is one of a speech utterance and a pre-recorded audio content. Further, the one or more hardware processors are capable of executing programmed instructions to facilitate receipt of a plurality of authentication parameters at the device. An authentication parameter from the plurality of authentication parameters is received from at least one of the device and a server communicably coupled to the device. Furthermore, the one or more hardware processors are capable of executing programmed instructions to encrypt the plurality of authentication parameters to generate a plurality of encrypted authentication parameters. Moreover, the one or more hardware processors are capable of executing programmed instructions to embed the plurality of encrypted authentication parameters as watermarks into the audio input to generate a watermarked audio signal. Also, the one or more hardware processors are capable of executing programmed instructions to encrypt the watermarked audio signal to generate an authentication audio signal. The authentication audio signal is transmitted to an authentication server over an audio communication channel to authenticate the access at the device for a communication session.

In yet another embodiment, a non-transitory computer-readable medium having embodied thereon a computer program for executing a method for multi-factor authentication is provided. The method includes facilitating receipt of an audio input at the device. The audio input is one of a speech utterance and a pre-recorded audio content. Further, the method includes facilitating receipt of a plurality of authentication parameters at the device, an authentication parameter from the plurality of authentication parameters being received from at least one of the device and a server communicably coupled to the device. Furthermore, the method includes encrypting the plurality of authentication parameters to generate a plurality of encrypted authentication parameters. Moreover, the method includes embedding the plurality of encrypted authentication parameters as watermarks into the audio input to generate a watermarked audio signal. Also, the method includes encrypting the watermarked audio signal to generate an authentication audio signal. The authentication audio signal is transmitted to an authentication server over a communication channel to authenticate the access at the device for a communication session.

In still another aspect, a processor-implemented method for multi-factor authentication to authenticate an access at a device for a communication session is provided. The method at an authentication server includes receiving, via one or more hardware processors at the authentication server, an authentication audio signal data from the device. The authentication audio signal data includes an encrypted watermarked audio signal. Further the method includes decrypting, via one or more hardware processors, the encrypted watermarked audio signal to obtain a watermarked audio signal. The watermarked audio signal includes an audio input watermarked with encrypted plurality of authentication parameters, where the audio signal is associated with a user of the device. Furthermore the method includes performing, via the one or more hardware processors, speaker verification on the watermarked audio signal to verify the user of the device. Moreover, the method includes extracting, upon verification of the user of the device, watermarks including the plurality of encrypted authentication parameters, from the watermarked audio signal. Additionally, the method includes verifying, via the one or more hardware processors, the plurality of encrypted authentication parameters based on a comparison of the plurality of encrypted authentication parameters with corresponding pre-stored plurality of authentication parameters, Verifying the plurality of authentication parameters facilities authentication of the access at the device for the communication session.

In still another aspect, a processor-implemented system for multi-factor authentication to authenticate an access at a device for a communication session is provided. The system includes: at least one memory; and one or more hardware processors. The at least one memory is coupled to the one or more hardware processors, wherein the one or more hardware processors are capable of executing programmed instructions stored in the at least one memory to receive an authentication audio signal data from the device. The authentication audio signal data includes an encrypted watermarked audio signal. Further the one or more hardware processors are capable of executing programmed instructions to decrypt the encrypted watermarked audio signal to obtain a watermarked audio signal. The watermarked audio signal includes an audio input watermarked with encrypted plurality of authentication parameters, where the audio signal is associated with a user of the device. Furthermore the one or more hardware processors are capable of executing programmed instructions to perform speaker verification on the watermarked audio signal to verify the user of the device. Moreover, the one or more hardware processors are capable of executing programmed instructions to extract, upon verification of the user of the device, watermarks including the plurality of encrypted authentication parameters, from the watermarked audio signal. Additionally, the one or more hardware processors are capable of executing programmed instructions to verify, the plurality of encrypted authentication parameters based on a comparison of the plurality of encrypted authentication parameters with corresponding pre-stored plurality of authentication parameters. Verifying the plurality of authentication parameters facilities authentication of the access at the device for the communication session.

In still another embodiment, a non-transitory computer-readable medium having embodied thereon a computer program for executing a method for multi-factor authentication to authenticate an access at a device for a communication session is provided. The method includes receiving, at the authentication server, an authentication audio signal data from the device, the authentication audio signal data comprising an encrypted watermarked audio signal; decrypting the encrypted watermarked audio signal to obtain a watermarked audio signal, the watermarked audio signal comprising an audio input watermarked with encrypted plurality of authentication parameters, the audio signal being associated with a user of the device; performing speaker verification on the watermarked audio signal to verify the user of the device; extracting, upon verification of the user of the device, watermarks comprising the plurality of encrypted authentication parameters, from the watermarked audio signal; and verifying the plurality of encrypted authentication parameters based on a comparison of the plurality of encrypted authentication parameters with corresponding pre-stored plurality of authentication parameters, wherein verifying the plurality of authentication parameters facilities authentication of the access at the device for the communication session.

It should be appreciated that any block diagram herein represents conceptual views of illustrative systems embodying the principles of the present subject matter. Similarly, it will be appreciated that any flow charts, flow diagrams, state transition diagrams, pseudo code, and the like represent various processes which may be substantially represented in non-transitory computer readable medium and so executed by a computing device or processor, whether or not such computing device or processor is explicitly shown.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
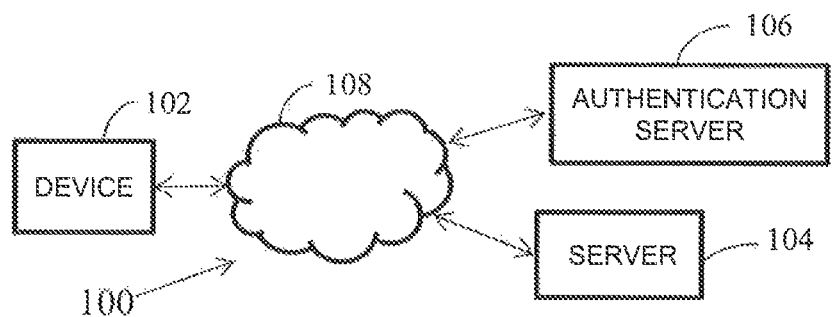
FIG. 1 illustrates a diagram of an example environment in which systems and/or methods, described herein, may be implemented, in accordance with an example embodiment.

FIG. 1 illustrates an exemplary diagram of an environment 100 implementing a multi-factor authentication system, in accordance with example embodiments. In one embodiment, the environment 100 includes at least one user device, for example a user device 102, a server 104, an authentication server 106, and a communication network 108. It will be noted herein that the number of devices and/or networks, illustrated in FIG. 1, is provided for explanatory purposes only. In practice or some example scenarios, there may be additional or fewer devices and/or networks; different devices and/or networks; or differently arranged devices and/or networks than illustrated in FIG. 1. Also, in some implementations, one or more of the devices of environment 100 may perform one or more functions described as being performed by another one or more of the devices of environment 100. In one example, the authentication server 106 and the server 104 may be combined into a single device and/or cyst Devices and/or networks of environment 100 may interconnect via wired connections, wireless connections (laser, infrared, RF, optical), or a combination of wired and wireless connections over the communication network 108.

The communication network 108 may be a wireless network, wired network or a combination thereof. The communication network 108 can be implemented as one of the different types of networks, such as intranet, local area network (LAN), wide area network (WAN), the internet, a metropolitan area network (MAN), an ad hoc network, an intranet, a fiber optic-based network, and/or a combination of these or other types of networks. Additionally or alternatively, the communication network 108 may include a cellular network, the Public Land Mobile Network (PLMN), a second generation (2G) network, a third generation (3G) network, a fourth generation (4G) network (e.g., a long term evolution (LTE) network), a fifth generation (5G) network, and/or another network. The communication network 108 may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further the communication network 108 may include a variety of network devices, including routers, bridges, servers, computing devices, storage devices, etc.

The user device 102 may include any computation or communication device that is capable of communicating via the communication network 108. For example, the user device 102 may be a computation device that may be capable of facilitating a user access to a service requiring user authentication. In another example, the user device 102 may be implemented in a variety of communication devices such as a laptop computer, a desktop computer, a notebook, a workstation, a mobile phone, a personal digital assistant (PDA), and so on. The user device is further configured to generate a watermarked audio signal that may be authenticated by, for example, the authentication sever 106 before providing a user access to an application/service at the user device 102. It will be noted herein that the 'user device' may belong to an owner/user of the device. Also, the terms 'user' and 'owner' may refer to the true and authenticated owner of the device who is authorized to use the device. Accordingly, the terms 'user' and 'owner' may be used interchangeably throughout the description.

The server 104 may include one or more server devices, or other types of computation and communication devices, for providing content. For example, the server 104 may host a website that can be accessed, by the user device 102, to receive content (e.g., video content, audio content, images, advertising content, web pages, and/or some combination thereof), and/or a service (e.g., a banking service, mail delivery services, e-commerce services such as online shopping, etc.). In an example implementation, the server 104 may be a banking server that may be accessed by a user of the device 102 for accessing the banking application. The banking server may be a web server that may provide account information and funds transfer functionality and other designated services when accessed using the user device 102. The server 104 may receive an access request from the user device 102 for facilitating access to the content and/or services. In response to the request, the server 104 may redirect the user device 102 to the authentication server 106 for authenticating the user access to the said content and/or services. The server 104 may provide the content and/or service to user device 102 upon being notified by the authentication server 106, indicating that the user, of user device 102, is authenticated. In an alternative embodiment, the server 104 may host an application that communicates with authentication server 106 to authenticate the user (or the user device 102).

The authentication server 106 may include one or more devices that gather, process, search, store, and/or provide information in a manner described herein. The authentication server 106 receives the encrypted watermarked audio signal from the user device, and performs a verification to determine authenticity of the watermarked audio signal associated with the user after it has been decrypted. The authentication server 106 may perform speaker verification on the decrypted watermarked audio signal for verifying the user. In an embodiment, the speaker verification may be performed based on speech analysis of the audio signal associated with the decrypted watermarked audio signal. For instance, the audio signal may be compared with one or more pre-stored templates associated with the audio signal representing a particular user for speaker verification. Various methods that may be utilized for performing speaker verification may include, but are not limited to spectral estimation, hidden Markov models, pattern matching algorithms, neural networks, and so on.

Upon verifying the user based on speaker verification, the authentication server performs watermark extraction from the watermarked audio signal. The extraction of the watermark may retrieve authentication parameters such as one time password (OTP), time based one-time password (TOTP), a unique device ID, unique hardware address, any other user defined password, and so on. The authentication server 106 may obtain the authentication parameters and may authenticate the user when the retrieved authentication parameters matches with authentication parameters stored in a database (or memory associated with the authentication server 106). Herein, it will be noted that the terms 'authentication parameters' refers to the factors for authentication such as an OTP, a TOTP, unique device ID, and other such examples provided herein. In accordance, the terms 'authentication parameters' and 'factors' may be used interchangeably throughout the description.

Figure 2:
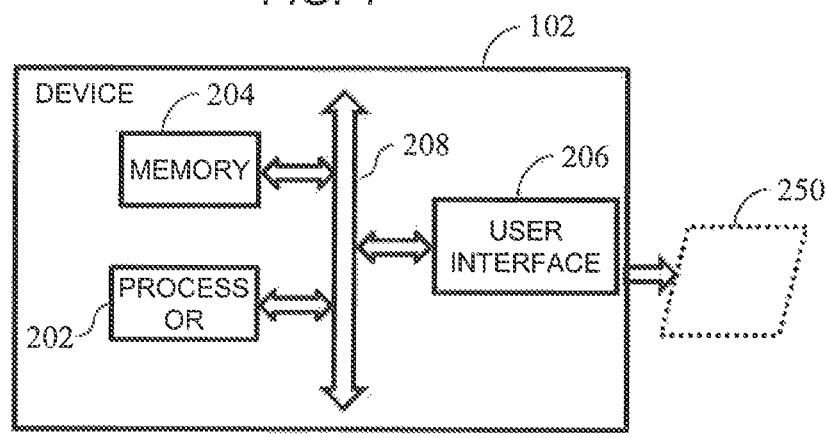
FIG. 2 is a block diagram of a device of FIG. 1, in accordance with an example embodiment.

FIG. 2 is a block diagram of a device, for example, the user device 102 of FIG. 1, in accordance with an example embodiment. The device 102 includes or is otherwise in communication with at least one processor such as a processor 202, at least one memory such as a memory 204, and a user interface 206. The processor 202, the memory 204, and the user interface 206 may be coupled by a system bus such as a system bus 208 or a similar mechanism. Although FIG. 2 shows example components of device 102, in other implementations, device 102 may contain fewer components, additional components, different components, or differently arranged components than depicted in FIG. 2.

The processor 202 may include circuitry implementing, among others, audio and logic functions associated with the communication. The processor 202 may also include the functionality to encode messages and/or data or information. The processor 202 may include, among other things, a clock, an arithmetic logic unit (ALU) and logic gates configured to support operation of the processor 202. Further, the processor 202 may include functionality to execute one or more software programs, which may be stored in the memory 204 or otherwise accessible to the processor 202.

The memory 204, may store any number of pieces of information, and data, used by the device 102 to implement the functions of the device 102. The memory 204 may include for example, volatile memory and/or non-volatile memory. Examples of volatile memory may include, but are not limited to volatile random access memory (RAM). The non-volatile memory may additionally or alternatively comprise an electrically erasable programmable read only memory (EEPROM), flash memory, hard drive, or the like. The memory 204 may be configured to store information, data, applications, instructions or the like for enabling the device 200 to carry out various functions in accordance with various example embodiments. Additionally or alternatively, the memory 204 may be configured to store instructions which when executed by the processor 202 causes the device 200 to behave in a manner as described in various embodiments.

The user interface 206 may include an output device such as a ringer, an earphone or speaker, a microphone, a display, and an input interface. The input interface is configured to receive an indication of a user input. Examples of the input interface may include, but are not limited to, a keyboard, a mouse, a joystick, a keypad, a touch screen, soft keys, and the like. The output user interface provides an audible, visual, mechanical or other output and/or feedback to the user. Examples of the output interface may include, but are not limited to, a display, a microphone, a speaker, ringers, vibrators, and the like. In an example embodiment, the user interface 206 may include, among other devices or elements, any or all of a speaker, a microphone, a display, and a keyboard, touch screen, or the like. The user interface 206 may be in communication with the processor 202. In this regard, for example, the processor 202 may comprise user interface circuitry configured to control at least some functions of one or more elements of the user interface 206. The processor 202 and/or user interface circuitry comprising the processor 202 may be configured to control one or more functions of one or more elements of the user interface 206 through computer program instructions, for example, software and/or firmware, stored on a memory, for example, the memory 204, and/or the like, accessible to the processor 202.

In an example embodiment, the user interface 206 is configured to receive an audio input. In an example embodiment, the audio input may include a speech utterance by the user. In an example scenario, the user interface 206 is configured to prompt a user to provide the audio input through at least one of a text, an audio and a visual interface. For example, as the user attempts to access an application/service (for example, a banking application) using the user device 102, the user interface 206 may display a message to the user to provide the audio input. In an example scenario, prompting the user to provide the audio input may include prompting the user to read out a text being displayed at the user device 102. In another example scenario, prompting the user may include asking one or more preconfigured questions from the user and utilizing user responses to the pre-configured questions as the audio input. In another example embodiment, the audio input may include a pre-recorded audio being provided as input to the device. Herein, it will be understood that audio input interface may be configured in accordance with an application of usage of the device 102, and is not limited to the audio inputs including only the speech utterance and the pre-recorded audio. Accordingly, the terms audio and speech may be used interchangeably throughout the description.

In an example embodiment, the processor 202 along with the memory 204 and other components of the device 102 may be configured to receive a plurality of authentication parameters at the device 102. In an embodiment, the plurality of authentication parameters may include one or more of device identifiers, user-defined passwords, one or more passwords received over the network, and so on. For example, the device identifier may include IMSA number or a unique hardware address of the device. Examples of one or more passwords received over the network may include a Pass Phrase, and one time password (OTP), a time-based one time password (TOTP). In certain scenarios, receiving the plurality of authentication parameters over the network may include receiving one or more of the plurality of authentication parameters from a server, for example, the server 104 (FIG. 1). Alternatively or additionally, receiving the plurality of authentication parameters may include retrieving the pre-stored authentication parameters from the device 102. For example, the processor 202 may retrieve the device ID from the memory of the device 102. In an example embodiment, the authentication parameters may be received at the device through one of a short messaging service (SMS), an email, an application, and a combination thereof.

In an example embodiment, the processor 202 along with memory 204 and other components of the device 102 may be configured to encrypt one or more of the plurality of authentication parameters to generate respective encrypted authentication parameters. For instance, the passphrase may be encrypted to generate an encrypted passphrase. Also, the TOTP and OTP may be encrypted to generate encrypted TOTP and OTP. It must be noted that any number and/or any combination of authentication parameters from among the plurality of authentication parameters may be utilized for generating the plurality of encrypted authentication parameters. The processor 202 along with memory 204 and other components of the device 102 are further configured to embed the encrypted authentication parameter into the audio input. In an example embodiment, the plurality of encrypted authentication parameters are embedded into the audio signal as watermark to generate a watermarked audio signal 250. For instance, the encrypted passphrase may be embedded as audio watermark, and the encrypted TOTP or OTP token may be embedded as additional audio watermarks.

The process of embedding the watermark (where the watermark includes the encrypted authentication parameters) includes modifying the audio signal such that it includes a cryptographically secure watermark which is added in some fashion (spatially or in some other domain) and is not visible to the end user. The watermark embedding can be done by a watermark embedding/encryption means (for example, the processor 202) using any of the linear watermark embedding methods. Finally, the watermark embedding/encryption means (for example, the processor 202) generates a watermarked video content. It will be noted that any technique for audio marking may be utilized herein for embedding the encrypted authentication parameter into the audio signal to generate the watermarked audio signal. The watermarked audio signal 250 may be encrypted for additional security to obtain an authentication audio signal. The authentication audio signal may then be transmitted to a server, for example, either through analog or digital communication mechanisms an authentication server 106 (FIG. 1) for user authentication. In an example embodiment, the watermarked audio signal 250 may be compressed prior to encryption so as to save on the bandwidth required for transmission of the authentication audio signal.

Figure 3:
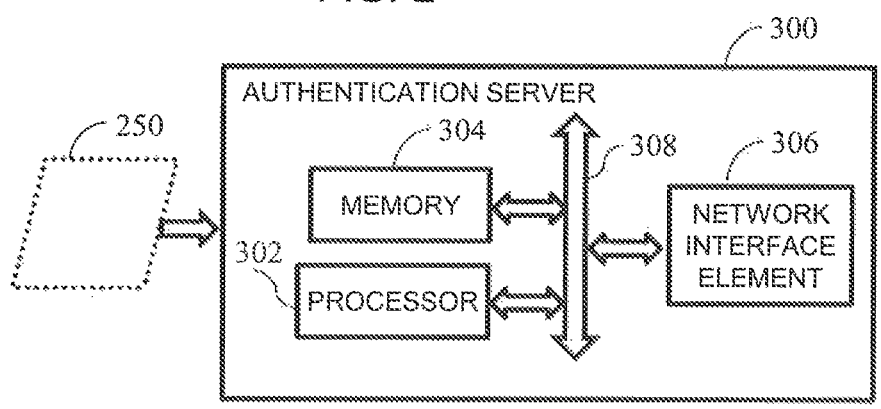
FIG. 3 is a block diagram of a server of FIG. 1, in accordance with an example embodiment.

FIG. 3 is a block diagram of an authentication server 300, in accordance with an example embodiment. In an example embodiment, the server 300 is the authentication server 106 of FIG. 1. Alternatively, the authentication server 300 may be the server 104 of FIG. 1, and in such embodiment, server 104 may incorporate the functionality of an authentication server such as the authentication server 300.

The authentication server 300 includes or is otherwise in communication with at least one processor such as a processor 302, at least one memory such as a memory 304, and a network interface element 306. The processor 302, memory 304, and the network interface element 306 may be coupled by a system bus such as a system bus 308 or a similar mechanism. Although FIG. 3 shows example components of the authentication server 300, in other implementations, the server authentication 300 may contain fewer components, additional components, different components, or differently arranged components than depicted in FIG. 3.

The processor 302 may include circuitry implementing, among others, audio and logic functions associated with the communication. The processor 302 may also include the functionality to encode messages and/or data or information. The processor 302 may also include the functionality to decode the messages/signals to retrieve data/information. The processor 302 may include, among other things, a clock, an arithmetic logic unit (ALU) and logic gates configured to support operation of the processor 302. Further, the processor 302 may include functionality to execute one or more software programs, which may be stored in the memory 304 or otherwise accessible to the processor 302.

The memory 304, may store any number of pieces of information, and data, used by the authentication server 300 to implement the functions of the authentication server 300. The memory 304 may include for example, volatile memory and/or non-volatile memory. Examples of volatile memory may include, but are not limited to volatile random access memory (RAM). The non-volatile memory may additionally or alternatively comprise an electrically erasable programmable read only memory (EEPROM), flash memory, hard drive, or the like. The memory 304 may be configured to store information, data, applications, instructions or the like for enabling the authentication server 300 to carry out various functions in accordance with various example embodiments. Additionally or alternatively, the memory 304 may be configured to store instructions which when executed by the processor 302 causes the authentication server 300 to behave in a manner as described in various embodiments.

The network interface element 306 is configured to facilitate communication of the component of the network with other components of the network. The network interface element 306 may be in form of a wireless connection or a wired connection. Examples of wireless network interface element 306 may include, but are not limited to, IEEE 802.11 (Wifi), BLUETOOTH®, or a wide-area wireless Internet connection. Example of wired network interface element 306 includes, but is not limited to Ethernet, DSL Internet connection.

The processor 302 along with the memory 304 and other components of the authentication server 300 is configured to receive an authentication audio signal, The authentication audio signal is received at the server 300 when a user attempts to access a service/application at a user device, for example the user device 102 (FIG. 1). In an embodiment, the authentication audio signal includes an encrypted watermarked audio signal, for example the watermarked audio signal 250 (FIG. 2) received from the user device. In an embodiment, the processor 302 along with the memory 304 and other components of the authentication server 300 is configured to determine authenticity of the encrypted watermarked audio signal 250. In an example embodiment, the encrypted watermarked audio signal is decrypted.

In an example embodiment, the encrypted watermarked audio signal may be a compressed signal, in which case, the processor 302 along with the memory 304 and other components of the authentication server 300 are configured to decompress the received watermarked audio signal 250. The processor 302 along with the memory 304 and other components of the server 300 are further configured to perform speaker identification of the watermarked audio signal. The speaker verification is performed to authenticate whether the audio (or speech) in the watermarked audio signal belongs to the authentic user (or owner of the device). Once it is verified that the audio (or speech) belongs to the authentic user, the processor 302 along with the memory 304 and other components of the authentication server 300 are configured to extract watermark from the watermarked audio signal. In an embodiment, the watermark includes encrypted one or more of the authentication parameters, and thus the extracting the watermark from the watermarked audio signal includes extracting the one or more of the plurality of authentication parameters embedded as watermarks in the watermarked audio signal. In an embodiment, the one or more of the authentication parameters extracted from the watermarked audio signal are decrypted.

The processor 302 along with the memory 304 and other components of the authentication server 300 are further configured to verify the one or more authentication parameters. In an embodiment, the verification of the one or more authentication parameters is performed based on a comparison of the one or more authentication parameters with corresponding one or more pre-stored authentication parameters. In an example embodiment, the corresponding one or more pre-stored authentication parameters may be stored in the memory of the authentication sever 300 securely. In another embodiment, the corresponding pre-stored authentication parameters may be stored in an external memory or database that is communicably coupled with the authentication server 300.

Figure 4:
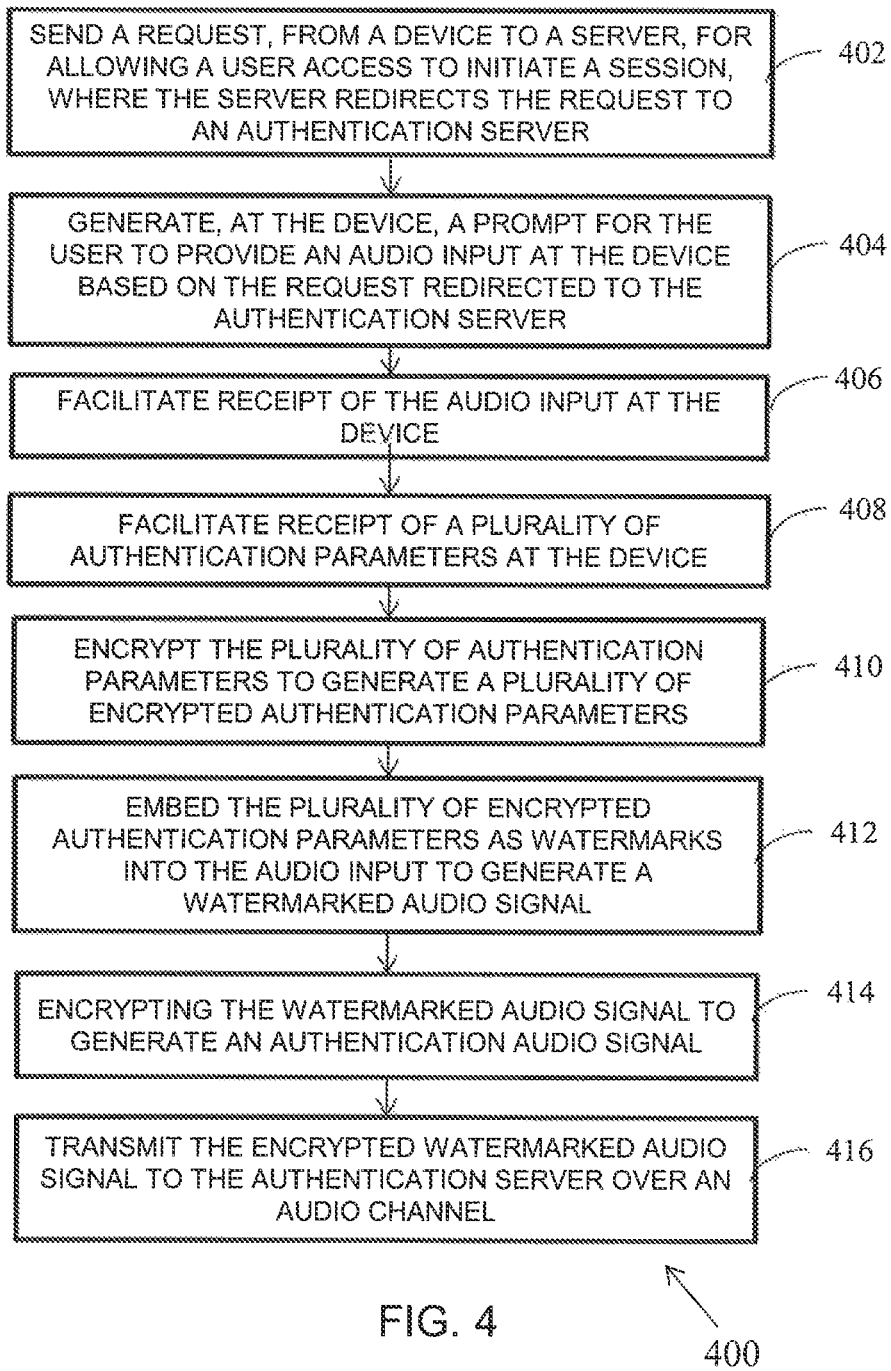
FIG. 4 is a flow chart of an example method for multi-factor authentication.

FIG. 4 illustrates a flowchart 400 of an example method for multi-factor authentication, in accordance with an example embodiment. It should be noted that herein various references will be made to FIGS. 1-3, for describing the method for multi-factor authentication.

In an example scenario, a user may initiate an access to a service/application by using a device (for example, the user device 102 of FIG. 1). For example, the user may attempt to access a banking application using the user device 102. However, before being granted an access to the banking application, the user has to be authenticated. In an example embodiment, a method for multi-factor authentication for authenticating the user access to a service/application at a device is described by way of flowchart 400.

At 402, a request is sent from the user device to a server (for example, the server 104) for accessing a service. In an embodiment, the server is configured to host the service/application, for example the banking application. In an embodiment, the server redirects the request for authentication to an authentication server (for example, the authentication server 106 of FIG. 1). Alternatively, the server may incorporate the functionality of the authentication server, and accordingly may facilitate in performing authentication-related tasks associated with the user access. In response to the request, the authentication server/server may facilitate the user device to generate a prompt for the user to provide an audio input at the device, at 404. For example, the user interface of the device may display a message prompting the user to answer a predetermined question in user's voice. Alternatively, the user interface of the device may display a message prompting the user to provide a pre-recorded voice. Herein, it will be understood that user device may prompt the user to provide a voice/speech/audio input in any manner without limiting the scope and functionality of various embodiments.

The user may provide the audio input as directed at the user interface of the device. At 406, the user device facilitates in receiving the audio input at the device. In an embodiment, the audio input may be an audio content or a speech utterance provided by the user. At 408, receipt of a plurality of authentication parameters is facilitated at the device. In an embodiment, the plurality of authentication parameters may at least partially be received from the authentication server/server. For example, the authentication server may send one or more authentication parameters such as an OTP, TOPT, and other such authentication parameters to device. In an embodiment, the authentication server/server may send one or more authentication parameters over wired or wireless communication channel to the user device. In an embodiment, the plurality of authentication parameters may additionally include authentication parameters for example, user defined passwords, device identifiers such as IMEA number, unique hardware address and so on. In an example embodiment, the plurality of authentication parameters may include one or more authentication parameters received from the authentication server, and/or device identifiers and/or user defined passwords, or any combination thereof.

At 410, the plurality of authentication parameters are encrypted to generate a plurality of encrypted authentication parameters. The plurality of encrypted authentication parameters may be utilized as a watermark for watermarking the audio input. At 412, the plurality of encrypted authentication parameter are embedded into the audio input as watermarks to generate a watermarked audio signal. The watermarked audio signal may be encrypted (for additional security) and may be compressed (for saving bandwidth) at 414. At 416, the encrypted watermarked audio signal is transmitted to the authentication server. The encrypted watermarked audio signal is transmitted as an authentication audio signal to the authentication server over the audio communication channel, Herein, it should be noted that the embodiments disclosed herein enables transmitting of multiple factors such as biometrics, pass phrases and tokens over a single encrypted channel using invisible audio watermarks, thereby providing a convenient and cost effective solution for authentication. A method for multi-factor authentication at the authentication server is described further with reference to FIGS. 5A and 5B.

Figure 5A:
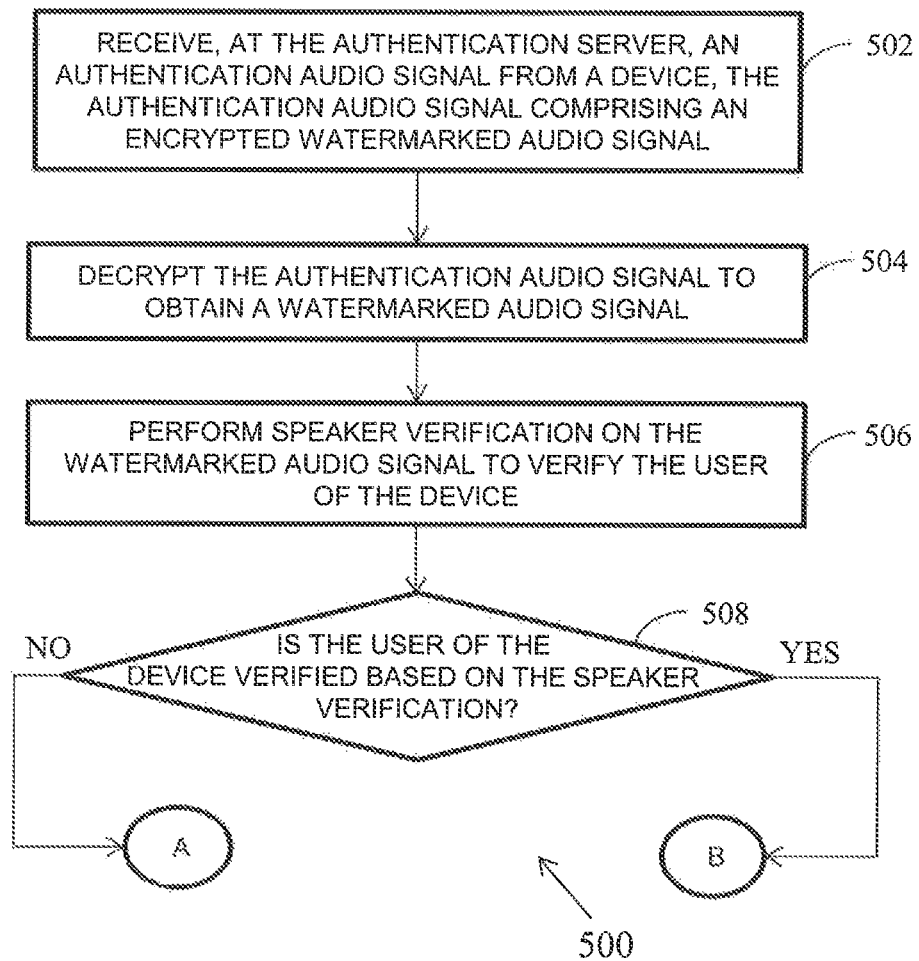
FIGS. 5A and 5B is a flow chart of an example method for multi-factor authentication, in accordance with another example embodiment.
Figure 5B:
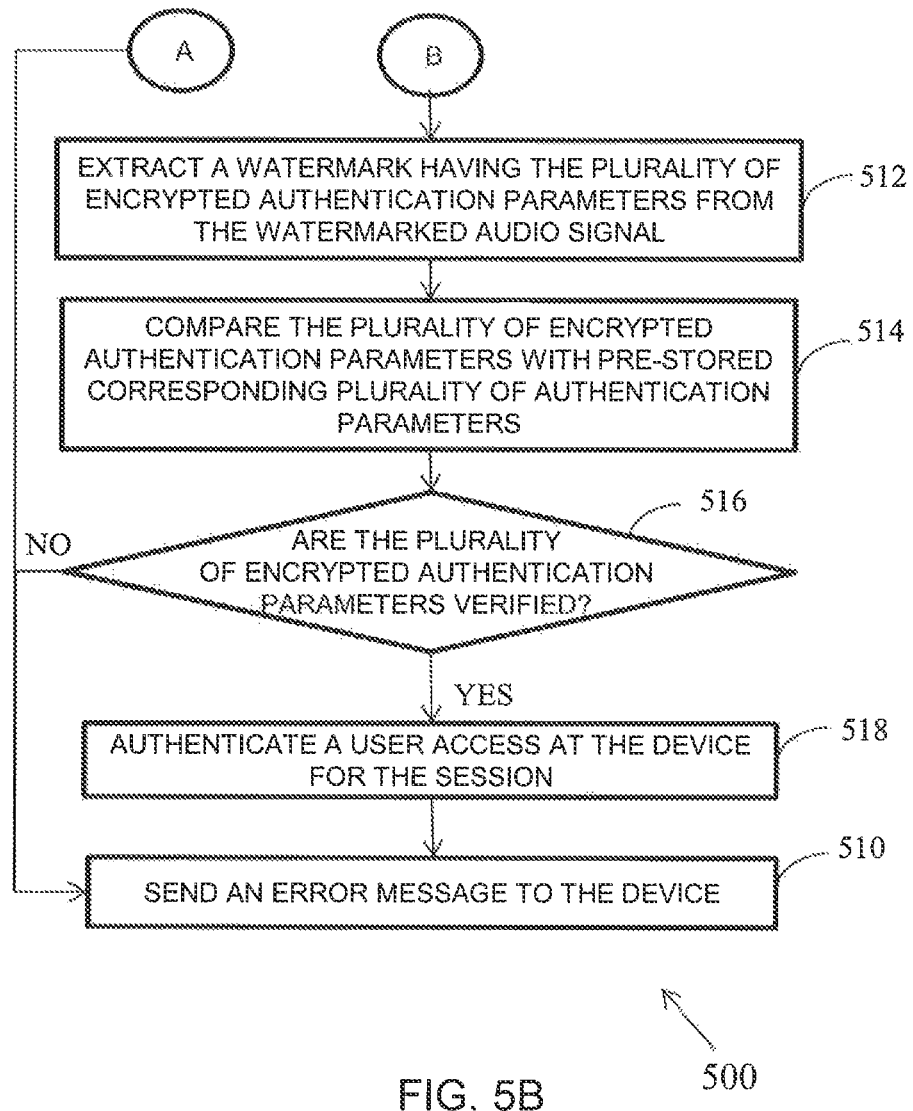

FIGS. 5A and 5B illustrate a flowchart 500 of an example method for multi-factor authentication at a server, for example, an authentication server, in accordance with an example embodiment. It should be noted that herein various references will be made to FIGS. 1-3, for describing the method for multi-factor authentication at the server.

At 502, the authentication server receives an authentication audio signal from a device, for example, the device 102 (FIG. 1). In an embodiment, the authentication audio signal includes an encrypted watermarked audio signal. In an example embodiment, the encrypted watermarked audio signal may be compressed prior to transmitting the encrypted watermarked audio signal to the authentication server. In such a scenario, the encrypted watermarked audio signal is decompressed at the authentication server to obtain the decompressed encrypted watermarked audio signal.

The encrypted watermarked audio signal is decrypted to obtain a watermarked audio signal, at 504. The watermarked audio signal includes audio content being watermarked with a plurality of authentication parameters. In an embodiment, the audio content may be a speech utterance by a user of the device. In another example embodiment, the audio content may be a pre-recorded audio content. At 506, a speaker verification of the watermarked audio signal is performed at the authentication server for authentication of the audio signal. In an embodiment, the speaker verification may be performed on the watermarked audio signal based on pre-stored audio content at the authentication sever/server. At 508, it is determined whether the user of the device is verified based on the speaker verification. If the user of the device is not successfully verified, an error message may be communicated to the device informing a failure of authentication attempt, at 510. If however, at 508 it is determined that the audio content in the watermarked audio signal belongs to an authentic user, the watermark including the encrypted plurality of authentication parameters is extracted from the watermarked audio signal at 512. At 514, the encrypted plurality of authentication parameters may be compared with the corresponding plurality of pre-stored authentication parameters so as to determine the authenticity of the user attempting to access the service/application. At 516, it may be determined whether the plurality of authentication parameters are verified based on the comparison. For example, the plurality of parameters such as OTP, Passphrase, TOTP, etc. may be received at the authentication server. in addition the corresponding authentication parameters such as OTP, Passphrase, TOTP etc. may be pre-stored at the authentication sever, Thus, the OTP received at the server is compared with the pre-stored OTP, the Passphrase received at the server is compared with the pre-stored Passphrase, the TOTP received at the server is compared with the pre-stored, and so on. In an embodiment, if at least one authentication parameter of the plurality of authentication parameters is not verified on comparison with the pre-stored authentication parameter at 516, an error message may be communicated to the device informing a failure of authentication attempt, at 510. If however, the plurality of authentication parameters are verified on comparison, the user access is authenticated at the device for the communication session, at 518. In an embodiment, authenticating the user access allows the user to perform transactions related on the device.

Various embodiments of the disclosure provide method and system for providing multi-factor authentication during communication. For example, various embodiments provides methods for generating watermark/watermark segment using authentication parameters such as unique device ID, OTP, TOTP, unique hardware address and the like and embedding the generated watermark segments into audio signals to generate watermarked audio signals. The watermarked audio signals are transmitted to authentication server for authenticating user access to associated services/application. The disclosed methods and systems described herein provide a scheme for malicious source detection of audio recordings, especially when the speech utterances or audio is recorded by an unauthenticated device. For example, as described herein, utilizing the watermarked audio signal for authentication ensures that the watermark persists in audio content if the audio is being sent from an authenticated source and, is not available when the audio is sent from malicious source. In other words, in case a malicious audio source utilizes a recording of original audio content for authentication, then the disclosed system is configured to detect the malicious source since the audio content or speech utterances recorded by the malicious source is devoid of watermark segment.

In addition, the multi-factor authentication method and system described herein utilizes a single communication channel only (which is an audio/speech communication channel) for transmitting authentication information. For example, multiple factors such as pass phrase, OTP, TOTP, device ID, and the like are encrypted and are embedded as a watermark into the speech (utterance of few seconds)/audio signal (pre-recorded audio signal). This speech/audio communication channel is used as the medium to securely transmit the authentication information to the authentication server. In some scenarios, the watermarked speech is further compressed to save the bandwidth, and also encrypted for security purposes. This encrypted speech information is decrypted and then checked for the credentials at the authentication sever.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is, however to be understood that the scope of the protection is extended to such a program and in addition to a computer-readable means having a message therein; such computer-readable storage means contain program-code and data means for implementation of one or more steps of the method, when the program runs on a surer or mobile device or any suitable programmable device. The hardware device can be any kind of device which can be programmed including e.g. any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor-implemented method for multi-factor authentication to authenticate an access at a device, comprising:
facilitating, via one or more hardware processors, a receipt of an audio input at the device;
facilitating, via the one or more hardware processors, a receipt of a plurality of authentication parameters at the device, an authentication parameter from the plurality of authentication parameters being received from one of the device and a server communicably coupled to the device;
encrypting, via the one or more hardware processors, the plurality of authentication parameters to generate a plurality of encrypted authentication parameters;
embedding, via the one or more hardware processors, the plurality of encrypted authentication parameters as watermarks into the audio input to generate a watermarked audio signal; and
encrypting, via the one or more hardware processors, the watermarked audio signal to generate an authentication audio signal,
wherein, the authentication audio signal being transmitted to an authentication server over an audio communication channel to authenticate the access at the device.

2. The method of claim 1, further comprising compressing the watermarked audio signal prior to the encrypting.

3. The method of claim 1, wherein the audio input comprises one of a speech utterance and a pre-recorded audio content.

4. The method of claim 3, wherein facilitating the receipt of the audio input comprises prompting a user to provide the speech utterance at the device through at least one of a text interface, an audio interface and a visual interface.

5. The method of claim 1, wherein the authentication parameter of the plurality of authentication parameters comprises one or more of a pass phrase, a one-time password (OTP), a time based one-time password (TOTP), a unique device identity (ID), and a unique hardware address.

6. A system for multi-factor authentication, the system associated with a device, comprising:
at least one memory; and
one or more hardware processors, the at least one memory coupled to the at least one processor, wherein the at least one processor is capable of executing programmed instructions stored in the at least one memory to:
facilitate a receipt of an audio input at the device, the audio input being one of a speech utterance and a pre-recorded audio content;
facilitate a receipt of a plurality of authentication parameters at the device, an authentication parameter from the plurality of authentication parameters being received from one of the device and a server communicably coupled to the device;
encrypt the plurality of authentication parameters to generate a plurality of encrypted authentication parameters;
embed the plurality of encrypted authentication parameters as watermarks into the audio input to generate a watermarked audio signal; and
encrypt the watermarked audio signal to generate an authentication audio signal,
wherein, the authentication audio signal being transmitted to an authentication server over an audio communication channel to authenticate the access at the device.

7. The system of claim 6, wherein the one or more hardware processors are further configured by instructions to compress the watermarked audio signal prior to encrypting.

8. The system of claim 6, wherein the audio input comprises one of a speech utterance and a pre-recorded audio content.

9. The system of claim 8, wherein for facilitating receipt of the audio input, the one or more hardware processors are further configured by instructions to prompt a user to provide the speech utterance at the device through at least one of a text interface, an audio interface, and a visual interface.

10. The system of claim 6, wherein an authentication parameter of the plurality of authentication parameters comprises one of a Pass Phrase, a one-time password (OTP), a time based one-time password (TOTP), a unique device ID, a unique hardware address and combinations thereof.

11. The system of claim 10, wherein the authentication parameter of the plurality of authentication parameters is received at the device through one of a short messaging service (SMS), an email, an application, and a combination thereof.

12. A non-transitory computer-readable medium having embodied thereon a computer program for executing a method for multi-factor authentication to authenticate an access at a device, the method comprising:
facilitating a receipt of an audio input at the device, the audio input being one of a speech utterance and a pre-recorded audio content;
facilitating a receipt of a plurality of authentication parameters at the device, an authentication parameter from the plurality of authentication parameters being received from one of the device and a server communicably coupled to the device;
encrypting the plurality of authentication parameters to generate a plurality of encrypted authentication parameters;
embedding the plurality of encrypted authentication parameters as watermarks into the audio input to generate a watermarked audio signal; and
encrypting the watermarked audio signal to generate an authentication audio signal, wherein, the authentication audio signal being transmitted to an authentication server over an audio communication channel to authenticate the access at the device.

13. A processor-implemented system for multi-factor authentication, the system associated with an authentication server, comprising:
at least one memory; and
one or more hardware processors, the at least one memory coupled to the at least one processor, wherein the at least one processor is capable of executing programmed instructions stored in the at least one memory to:
receive, at the authentication server, an authentication audio signal data from the device, the authentication audio signal data comprising an encrypted watermarked audio signal;
decrypt the encrypted watermarked audio signal to obtain a watermarked audio signal, the watermarked audio signal comprising an audio input watermarked with a plurality of encrypted authentication parameters, the audio signal being associated with a user of the device:

perform speaker verification on the watermarked audio signal to verify the user of he device;

extract, upon verification of the user of the device, a watermark comprising the plurality of encrypted authentication parameters, from the watermarked audio signal; and verify the plurality of encrypted authentication parameters based on a comparison of the plurality of encrypted authentication parameters with corresponding pre-stored plurality of authentication parameters, wherein verifying the plurality of encrypted authentication parameters facilities authentication of the access at the device.

14. The system of claim 13, wherein the audio input comprises one of a speech utterance and a pre-recorded audio content.

15. The system of claim 13, wherein an authentication parameter of the plurality of authentication parameters comprises one of a Pass Phrase, an one time password (OTP), a TOTP, a device ID, and combinations thereof.

* * * * *